US007452474B2

(12) United States Patent
Komuro et al.

(10) Patent No.: US 7,452,474 B2
(45) Date of Patent: Nov. 18, 2008

(54) METHOD OF MANUFACTURING SUBSTRATE FOR INK JET RECORDING HEAD AND METHOD OF MANUFACTURING RECORDING HEAD USING SUBSTRATE MANUFACTURED BY THIS METHOD

(75) Inventors: Hirokazu Komuro, Yokohama (JP); Teruo Ozaki, Yokohama (JP); Shuji Koyama, Kawasaki (JP); Kousuke Kubo, Yokohama (JP); Makoto Terui, Yokohama (JP); Kazuhiro Hayakawa, Isehara (JP); Ryoji Kanri, Isehara (JP); Masataka Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 11/118,404

(22) Filed: May 2, 2005

(65) Prior Publication Data

US 2005/0248623 A1 Nov. 10, 2005

(30) Foreign Application Priority Data

May 6, 2004 (JP) ............................. 2004-137510
Apr. 1, 2005 (JP) ............................. 2005-106287

(51) Int. Cl.
*G01D 15/00* (2006.01)

(52) U.S. Cl. ............................. 216/27; 216/87; 347/62; 347/63; 347/64; 347/65; 430/320

(58) Field of Classification Search ................... 216/27; 347/62; 430/320
See application file for complete search history.

(56) References Cited

U.S. PATENT DOCUMENTS 4,720,716 A 1/1988 Ikeda et al. ............. 346/140 R (Continued)

FOREIGN PATENT DOCUMENTS

JP 60-159062 8/1985

(Continued)

OTHER PUBLICATIONS

European Patent Office Communication dated Apr. 19, 2007 issued in corresponding application No. 05 009 443.2.

(Continued)

*Primary Examiner*—Nadinr Norton
*Assistant Examiner*—Maki Angadi
(74) *Attorney, Agent, or Firm*—Fitzpatrick, Cella, Harper & Scinto

(57) ABSTRACT

In order to form a more homogenous heat generating resistive layer, the present invention provides a method of manufacturing a substrate for an ink jet recording head having a support which has an insulative layer on its surface, a pair of electrode layers disposed on the surface of the support, and a heat generating resistive layer which continuously covers the pair of electrode layers and a section between the pair of electrode layers. The method includes the step of forming an electrode layer on the support and the step of forming the pair of electrode layers by etching the electrode layer. In the step of forming the pair of electrode layers by etching the electrode layer, by etching a surface portion of the insulative layer positioned between the pair of insulative layers, a recess is formed in the surface portion of the insulative layer.

54 Claims, 6 Drawing Sheets

U.S. PATENT DOCUMENTS

| | | | | |
|---|---|---|---|---|
| 5,491,505 | A | 2/1996 | Suzuki et al. | 347/203 |
| 5,636,441 | A * | 6/1997 | Meyer et al. | 29/890.1 |
| 5,837,057 | A | 11/1998 | Koyama et al. | |
| 6,142,606 | A | 11/2000 | Kubota et al. | 347/45 |
| 6,357,862 | B1 | 3/2002 | Ozaki et al. | 347/58 |
| 6,402,302 | B1 | 6/2002 | Ozaki et al. | 347/65 |
| 6,443,563 | B1 | 9/2002 | Saito et al. | 347/65 |
| 6,467,884 | B1 * | 10/2002 | Murooka et al. | 347/64 |
| 6,474,769 | B1 | 11/2002 | Imanaka et al. | 347/19 |
| 6,485,132 | B1 | 11/2002 | Hiroki et al. | 347/65 |
| 6,513,911 | B1 | 2/2003 | Ozaki et al. | 347/58 |
| 6,540,330 | B1 | 4/2003 | Kubota et al. | 347/45 |
| 6,540,336 | B2 | 4/2003 | Kubota et al. | 347/65 |
| 6,752,487 | B1 | 6/2004 | Kubota et al. | 347/45 |
| 6,969,154 | B2 | 11/2005 | Takeuchi et al. | 347/59 |
| 2002/0041301 | A1 * | 4/2002 | Jeon et al. | 347/20 |
| 2006/0033780 | A1 | 2/2006 | Ono et al. | 347/59 |
| 2006/0033782 | A1 | 2/2006 | Sakai et al. | 347/64 |

FOREIGN PATENT DOCUMENTS

| | | |
|---|---|---|
| JP | 2000-177135 | 6/2000 |

OTHER PUBLICATIONS

Communication dated May 20, 2008, from the European Patent Office in a corresponding European patent application.

* cited by examiner

METHOD OF MANUFACTURING SUBSTRATE FOR INK JET RECORDING HEAD AND METHOD OF MANUFACTURING RECORDING HEAD USING SUBSTRATE MANUFACTURED BY THIS METHOD

BACKGROUND OF THE INVENTION

1. Field of the Invention

The present invention relates to a method of manufacturing an ink jet recording head and a method of manufacturing a recording head using the substrate manufactured by this method.

2. Related Background Art

An ink jet recording head that has, as its component parts, an orifice provided to discharge a liquid and a heat acting portion (a heat generating portion), which is a portion in communication with this orifice and in which heat energy to discharge liquid droplets acts on the liquid, is described, for example, in FIGS. 1 and 3 of the Japanese Patent Application Laid-Open No. S60-159062. A structure corresponding to FIG. 1 of this patent publication is shown in FIG. 9. In this structure, a heat generating resistive layer 204, which generates heat when it is energized, is provided on a lower layer 202 of a substrate 200, and a pair of electrodes 203 is provided on the heat generating resistive layer 204 for one heat generating portion. Furthermore, on the heat generating resistive layer 204 and the electrode layers 203 there are provided an insulative protective layer 205 to protect these layers 204 and 203 from ink, and on the insulative protective layer 205 there is provided a metal protective layer 206 to protect the insulative protective layer 205 from cavitation that occurs when bubbles formed by the bubbling of the ink disappear. A structure corresponding to FIG. 3 of the Japanese Patent Application Laid-Open No. S60-159062 is shown in FIG. 10. This structure is the same as the structure shown in FIG. 9, with the exception that the vertical arrangement of the electrode layers 203 and the heat generating resistive layer 204 is reversed from that of FIG. 9.

For example, in FIG. 9, end portions 203*a* of the two electrode layers 203 fronting on a heat generating portion 207 are formed in such a manner as to have some inclination. However, the closer to perpendicularity to the heat generating resistive layer 204 the inclination of the end surfaces 203*a*, the more imperfect covering portions will be formed in the insulative protective layer 205 that covers a rising portion 210 from the heat generating resistive layer 204 of the end surface 203*a*, with the result that the insulative protective layer 205 may sometimes be unable to exhibit its function of insulation. Therefore, when the electrode layer 203 is provided so that the inclination of the end surface 203*a* forms a small angle with the heat generating resistive layer 204, the bottom end portion of the end surface 203*a* with a more acute angle (the leading end portion of the inclination of the end surface 203*a*) is broken or the area of the heat generating resistive layer (heat generating portion) positioned between the pair of electrode layers 203 varies due to errors in the position accuracy of the bottom end of the end surface 203*a* that occur during the formation of the electrode layer 203 and the like. As a result of this, variations occur in the calorific value of the heat generating portions 207. This poses a problem to be solved when a record image of higher grade is sought.

In FIG. 10, a pair of electrode layers 203 are provided on a lower layer 202 in such a manner as to sandwich a heat generating portion 207, and a heat generating resistive layer 204 is provided on the electrode layers 203. In the case of this construction, the heat generating resistive layer 204, the material itself used for which is hard, covers the electrode layers 203 as a relatively hard layer and, therefore, thermal deformation of the electrode layers 203 (for example, a hillock that occurs when the electrode layers are formed from aluminum) does not occur even when an insulative protective layer 205 to be formed on the heat generating resistive layer 204 is formed at a high temperature. Therefore, it is possible to form an insulative protective layer 205 in a dense manner and the layer thickness can be made small. As a result of this, the heat from the heat generating portion 207 can be transmitted to ink more efficiently.

However, even in the structure of FIG. 10, in addition to problems posed by the angle of the leading end of an end surface 203*a* of the electrode layer 203 and variations in the area of the heat generating portion as in the case of the structure of FIG. 9, the closer to perpendicularity to the lower layer 202 the end surface 203*a*, the worse the film quality of the heat generating resistive layer 204 that covers a rising portion 210 of the end surface 203*a* than other parts when the heat generating resistive layer 204 is formed on the electrode layer 203, thereby posing a further problem. Therefore, when a heat generating resistive body constituted by the pair of electrode layers 203 and the heat generating resistive layer 204 is driven, current concentration occurs in the heat generating resistive layer 204 at the end surface 203*a* opposed to the pair of electrodes 203 (the portion where a level difference with respect to the lower layer 202 is formed), the temperature rises locally and thermal stresses may be generated. This poses a problem. In addition to these problems, when a heat generating resistive body is continuously driven at high frequencies in order to adapt to high speed, high definition recording for which requirements are increasing today, there is a strong possibility that stronger thermal stresses may be generated, thereby causing broken wires in the heat generating resistive layer.

SUMMARY OF THE INVENTION

The present invention can provide a method of manufacturing a substrate for an ink jet recording head which suppresses the occurrence of broken wires due to thermal stresses in a substrate for an ink jet recording head having a heat generating resistive layer covering electrode layers and in which the durability of a heat generating resistive body is improved, and a method of manufacturing an ink jet recording head.

The present invention can also provide a method of manufacturing a substrate for an ink jet recording head which improves the step coverage of a protective film covering a heat generating resistive layer so that sufficient durability of a heat generating resistive body can be ensured even when the protective film is made thin, whereby the heat generated in the heat generating resistive body is efficiently used in the discharge of ink to save power, and a method of manufacturing an ink jet recording head.

Further, the present invention can provide a method of manufacturing a substrate for an ink jet recording head having a support which has an insulative layer on its surface, a pair of electrode layers disposed on the surface of the support, and a heat generating resistive layer which continuously covers the pair of electrode layers and a section between the pair of electrode layers, which comprises the step of forming an electrode layer on the support and the step of forming the pair of electrode layers by etching the electrode layer, and in which in the step of forming the pair of electrode layers, by etching a surface portion of the insulative layer positioned between the pair of insulative layers, a recess is formed in the surface portion of the insulative layer, and a method of manufacturing an ink jet recording head by using this substrate for an ink jet recording head.

DETAILED DESCRIPTION OF THE PREFERRED EMBODIMENTS

The present invention will be concretely described below by using embodiments with reference to the accompanying drawings as required.

Figure 1:
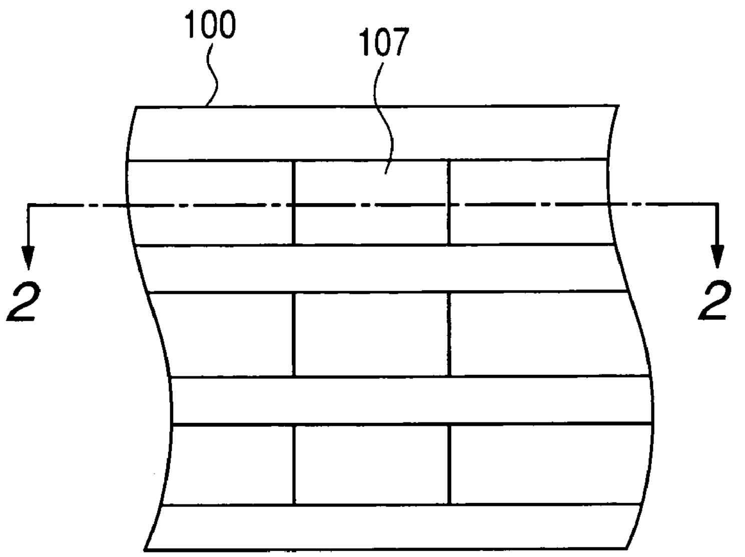
FIG. 1 is a schematic plan view of a substrate for an ink jet recording head manufactured by a manufacturing method of the present invention.
Figure 2:
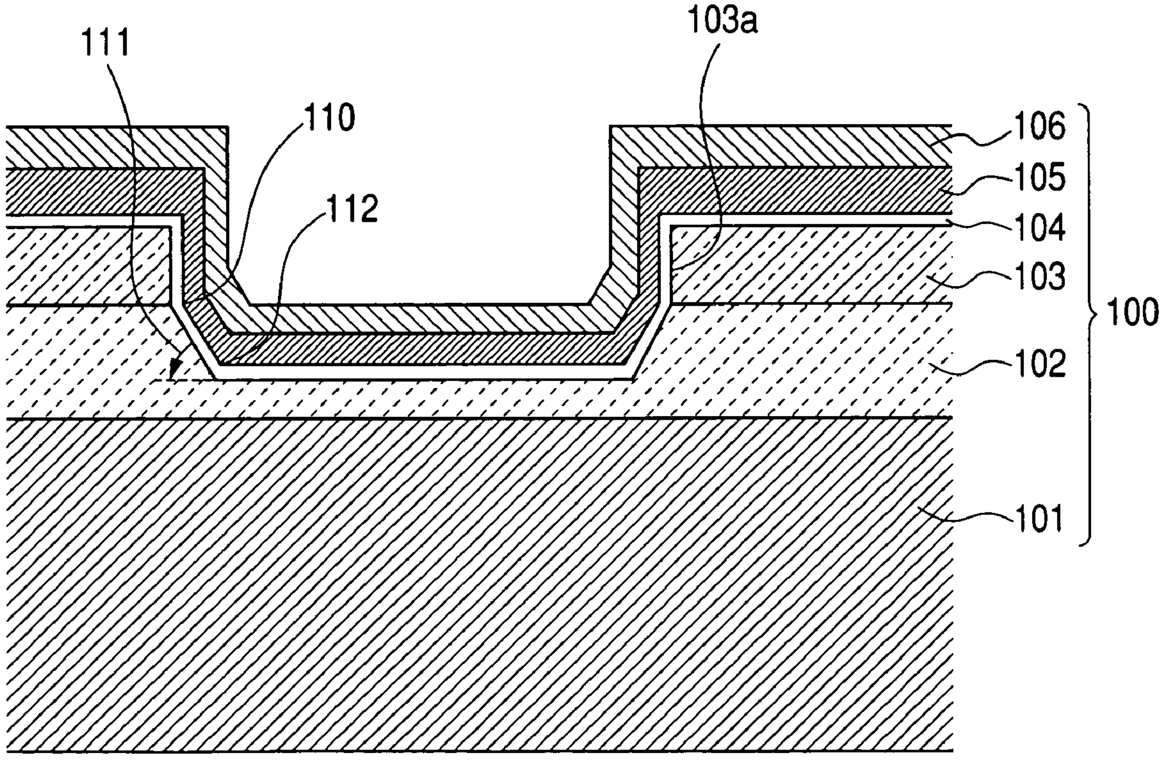
FIG. 2 is a schematic sectional view of an embodiment of a substrate for an ink jet recording head manufactured by a manufacturing method of the present invention.

FIG. 1 is a schematic plan view that shows the construction of a substrate for an ink jet recording head according to the present invention and, particularly, a plan view that shows the area near a heat acting portion 107 of a substrate for a head. FIG. 2 is a schematic sectional view of the section taken along the line 2-2 in FIG. 1.

In a substrate for an ink jet recording head of the form shown in FIG. 2, a heat generating resistive layer 104 covers a pair of electrode layers 103 formed on a lower layer (a heat accumulation layer) 102, which is formed on a surface of a board 101, and in the lower layer 102 there is formed a recess in a position corresponding to a section between the pair of electrode layers.

Heat generated in the heat generating resistive layer 104 positioned between the pair of electrode layers 103 by supplying power to a heat generating resistive body, which is constituted by the electrodes 103, the heat generating resistive layer 104, etc., is transmitted from a heat acting portion 107 to a liquid such as ink.

According to this structure, the heat generating resistive layer 104 is bent in rough U shape within the recess formed in the section of the lower layer 102 between the pair of electrode layers 103. For this reason, the portion of the heat generating resistive layer 104 to which thermal stresses due to current concentration are applied most strongly (i.e., the portion of the heat generating resistive layer 104 which covers a boundary 110 between an end portion (a stepped portion) 103*a* of the electrode layer 103 and the lower layer 102 is away from a bent portion 112 where the film quality of the heat generating resistive layer 104 is relatively poor, and hence it is possible to suppress the occurrence of broken wires of the heat generating resistive layer 104 caused by thermal stresses generated in the heat generating resistive layer 104.

Furthermore, when a taper angle 111 is formed in a portion of the lower layer 102 (a wall surface of the recess) which is continuous from the end portion 103*a* of the electrode layer 103, the bend angle in a roughly U-shaped bent portion 112 of the heat generating resistive layer 104 positioned between the pair of electrode layers 103 becomes gentler. Therefore, the film quality of the heat generating resistive layer 104 in the surface portion can be made better and the discharge endurance can be improved.

Figure 3:
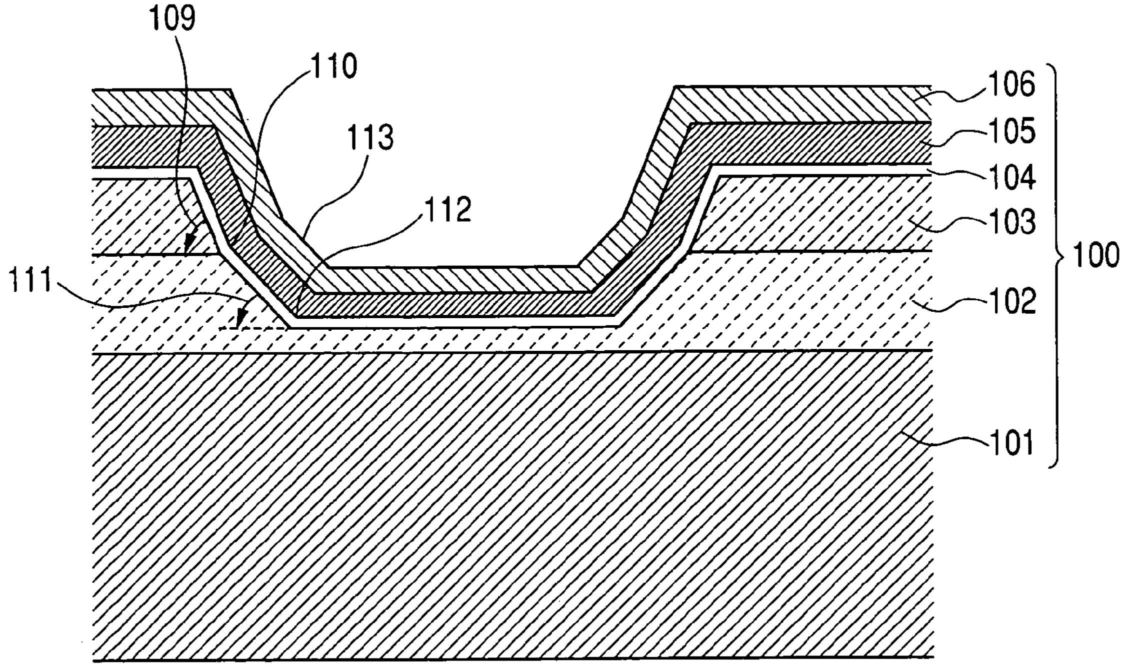
FIG. 3 is a schematic sectional view of another embodiment of a substrate for an ink jet recording head manufactured by a manufacturing method of the present invention.
Figure 4:
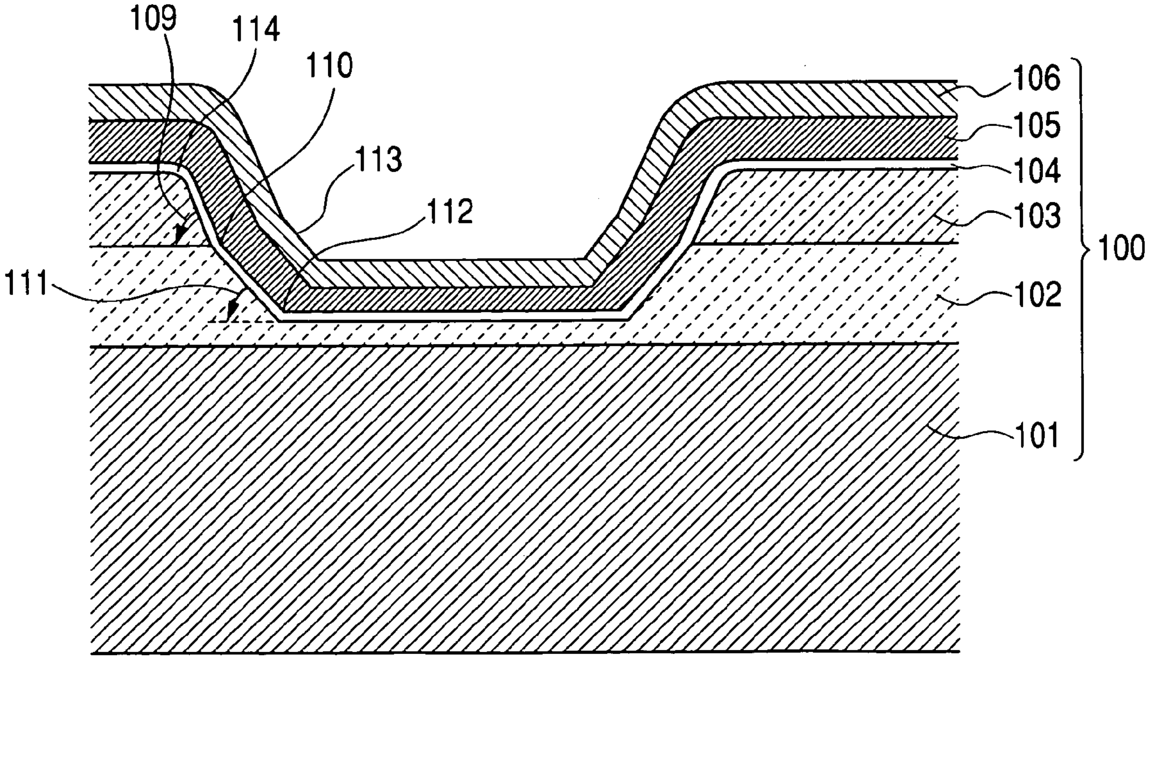
FIG. 4 is a schematic sectional view of a further embodiment of a substrate for an ink jet recording head manufactured by a manufacturing method of the present invention.

Furthermore, by forming the substrate as shown in FIGS. 3 and 4 below, the structure of the bent portion 112 can be formed gentler, whereby the occurrence of broken wires of the heat generating resistive layer 104 due to thermal stresses generated in the heat generating resistive layer 104 is further suppressed and the discharge endurance can be further improved. Also, in the structure thus formed, as shown in FIGS. 3 and 4, the shape of the bent portion 113 of the protective layer becomes gentler than the shape of the structure of FIG. 2 and the step coverage of protective layers 105, 106 becomes better than the step coverage of the structure of FIG. 2. For this reason, the film thickness of the upper insulative protective layer is further reduced and a liquid such as ink can be discharged by ensuring bubbling with less power.

As shown in FIG. 3, by ensuring that the angle 109 of a tapered shape (the taper angle of the electrode layer) in an end portion 103*a* of an electrode layer 103 is larger than the taper angle 111 (the taper angle of the base) in a tapered portion of a support (a lower layer 102), which is a base of an electrode layer 103, and smaller than 90 degrees, a heat generating resistive layer 104 at a boundary 110 between the portion covering the tapered portion of the lower layer 102 and the portion covering the top of the end portion of the electrode layer 103 which is continuous with the surface portion can be made gentler than in the structure of FIG. 2. As a result of this, because the film quality of the surface portion of the heat generating resistive layer 104 can be improved, the occurrence of broken wires due to thermal stresses can be further suppressed and the discharge durability can be further improved. The smaller the taper angle 111 in the lower layer 102, the more the film quality of the surface portion of the heat generating resistive layer 104 will be improved, and hence this is desirable. However, as described above, the smaller the taper angle 109 of the tapered portion in the end portion of the electrode layer 103, the lower the accuracy of the distance between the pair of electrode layers 103, and the more variations in the electrical properties as a heat generating portion 107 will be apt to occur. Therefore, it is necessary to pay attention to this point.

Furthermore, as shown in FIG. 4, by forming the corner of an edge portion 114 on the front surface side of an electrode layer 103 in such a manner as to provide a rounded surface, the step coverage of the upper insulative protective layer 105 and upper metal protective layer 106 that cover a heat generating resistive layer 104 is further improved. For this reason, it is possible to make the film thickness of the upper insulative protective layer 105 and upper metal protective layer 106 smaller than in the case of the structures of FIGS. 2 and 3 without impairing the discharge endurance performance. As a result of this, power can be saved when the heat from a heat generating portion is transmitted to ink.

By forming the corner of the edge portion 114 of the electrode layer 103 by sputter etching in such a manner as to provide a curved surface and subsequently forming a film of the heat generating resistive layer 104 within a device in which this sputter etching is performed, it is possible to improve the step coverage of the upper insulative protective layer 105 and upper metal protective layer 106 that cover the heat generating resistive layer 104 while suppressing a rise in the manufacturing cost to a minimum.

Next, methods of manufacturing a substrate for an ink jet recording head capable of producing excellent effects owing to structures as described above will be described below with reference to FIGS. 5A, 5B, 5C, 5D, 5E, 5F, 5G, 6A, 6B, 6C, 6D, 6E and 6F. Incidentally, FIGS. 5A, 5B, 5C, 5D, 5E, 5F and 5G sequentially explain the manufacturing process of the structure shown in FIGS. 2, 6A, 6B, 6C, 6D, 6E and 6F sequentially explain the manufacturing process of the structures shown in FIGS. 3 and 4 by using the section taken along the line 2-2 of FIG. 1.

Figure 5A:
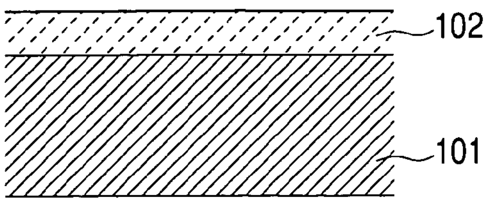
FIGS. 5A, 5B, 5C, 5D, 5E, 5F and 5G are each a diagram of a step to explain a method of manufacturing a substrate for an ink jet recording head that is an embodiment of the present invention.
Figure 5B:
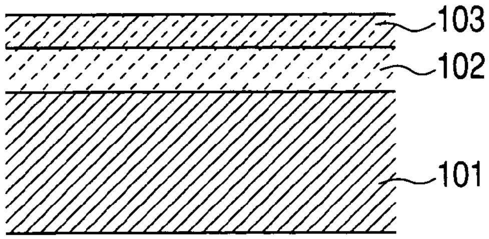
Figure 5C:
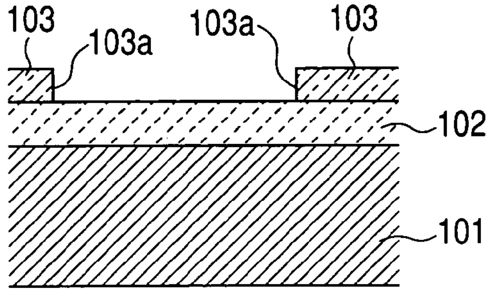
Figure 5D:
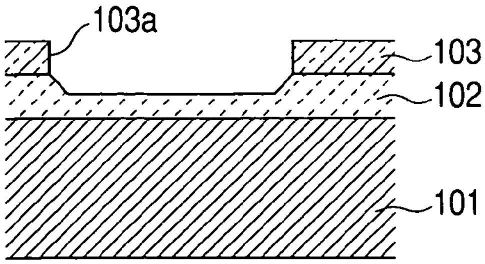

First, the steps shown in FIGS. 5A, 5B, 5C, 5D, 5E, 5F and 5G will be described. An $SiO_2$ layer which becomes a heat accumulation layer 102 was formed on a silicon board 101 in a thickness of 1.0 μm by the thermal oxidation method (FIG. 5A) and Al was formed as an electrode layer 103 on the heat accumulation layer 102 in a thickness of 0.6 μm by the sputtering method (FIG. 5B). And a resist was patterned in a desired shape on the electrode layer 103 by the photolithography method and the electrode layer 103 was etched by dry etching, whereby the electrode layer 103 having a desired wiring configuration was obtained (FIG. 5C). This etching was performed by use of an ECR etching device. For the etching conditions, the gas pressure was 2.66 Pa, $Cl_2/BCl_2$ gas was used, and the microwave power was 100 W. Etching was performed so that a patterning end portion 103*a* of the electrode layer 103 became substantially perpendicular to the substrate as shown in FIG. 5C in an etching time of a little less than about 50 seconds. When a somewhat high vacuum of 1.33 Pa is achieved by lowering the gas pressure, the heat accumulation layer 102 which becomes exposed due to the etching of the electrode layer 103 begins to be etched in concave shape. Although the electrode layer 103 is etched mainly by chemical drying, the heat accumulation layer 102, for which etching is performed in an atmosphere of higher vacuum, is etched mainly by sputter etching. For this reason, the end portion of the heat accumulation layer 102 which is continuous from the end portion 103*a* of the electrode layer 103 was etched in such a manner as to provide a tapered inclined surface having a certain angle (FIG. 5D)

Figure 5E:
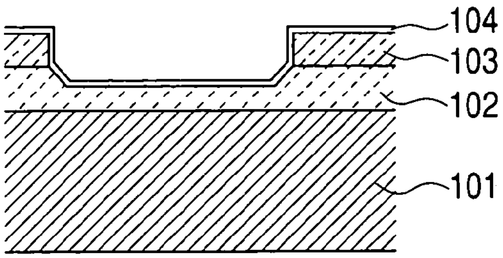
Figure 5F:
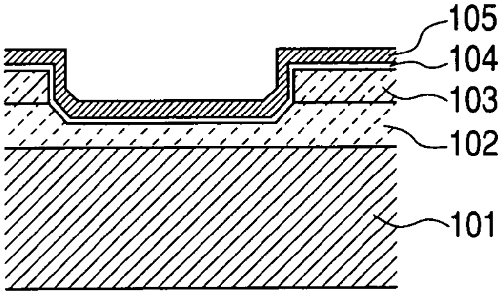
Figure 5G:
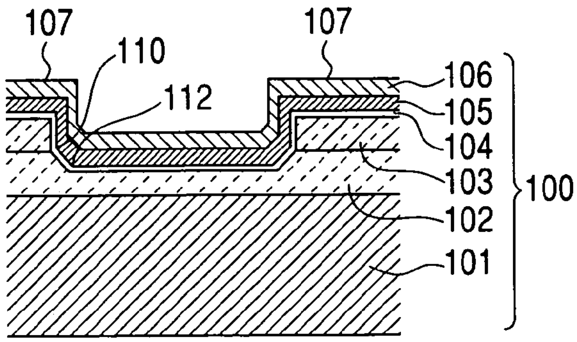

Next, a TaN film was formed as a heat generating resistive layer 104 on the patterned electrode layer 103 in a thickness of 0.04 μm by the sputtering method (FIG. 5E). And a resist was patterned in a desired shape by the photolithography method and a heat generating portion 107 was formed by the dry etching method or the wet etching method. Subsequently, an SiN film was formed from ink in a thickness of 0.3 μm by the plasma CVD method as an upper insulative protective film 105 to protect the electrode layer 103 and the heat generating resistive layer 104 (FIG. 5F). Furthermore, in order to prevent the electrode layer 103, the heat generating resistive layer 104 and the upper insulative protective layer 105 from being damaged when bubbles disappear (during bubble disappearance), as shown in FIG. 5G, a Ta film was formed as a metal protective layer 106 in a thickness of 0.2 μm. Incidentally, the protective layer may be a single layer of a single material or, as described above, it may have a laminated structure of an insulative layer 105 of, for example, $Si_3N_4$, $SiO_2$, SiON, $Ta_2O_5$, etc., and a metal layer 106 of Ta, etc., to improve cavitation resistance.

A substrate for an ink jet recording head having the heat generating portion 107 was thus formed.

Figure 6A:
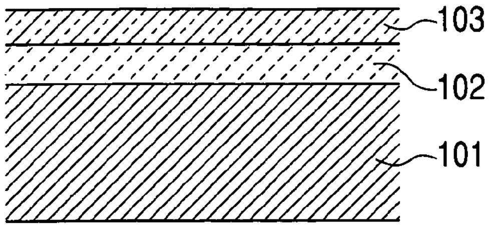
FIGS. 6A, 6B, 6C, 6D, 6E and 6F are each a diagram of a step to explain another method of manufacturing a substrate for an ink jet recording head that is an embodiment of the present invention.
Figure 6B:
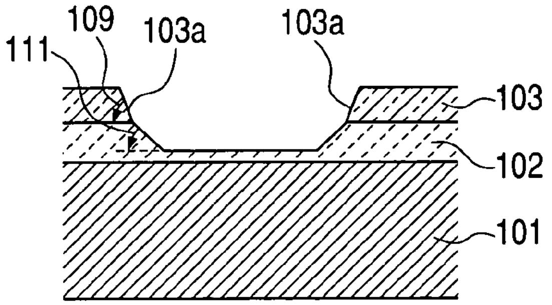

Next, the steps shown in FIGS. 6A, 6B, 6C, 6D, 6E and 6F will be described. FIG. 6A corresponds to FIG. 5B. An $SiO_2$ layer having a thickness of 1.0 μm which becomes a heat accumulation layer 102 was formed on a silicon board 101 by the thermal oxidation method and Al was formed as an electrode layer 103 having a thickness of 0.6 μm on the heat accumulation layer 102 by the sputtering method. Subsequently, a resist was patterned in a desired shape by the photolithography method and the electrode layer 103 and the heat accumulation layer 102 were etched by the dry etch method. This etching was performed by use of an ECR etching device. In order to form a taper angle in end portions of the two layers, the etching conditions were such that the gas pressure was 1.33 Pa, $Cl_2/BCl_2$ gas was used, and the microwave power was 100 W (in the steps shown in FIGS. 5A, 5B, 5C, 5D, 5E, 5F and 5G, the same as the dry etching conditions shown in FIG. 5D and following figures). It took 120 seconds to etch the electrode layer 103 required, and it took 70 seconds to etch the heat accumulation layer 102. As described above, the end portions of the two layers were etched mainly by sputter etching rather than by chemical dry etching. At that time, because of the low etching rate of the $SiO_2$ layer which is the heat accumulation layer 102 compared to Al of the electrode layer 103, the tapered shape varied further and the taper angle became smaller (FIG. 6B). In this embodiment, the heat accumulation layer 102 had a taper angle 111 of 60 degrees and the electrode layer 103 had a taper angle 109 of 70 degrees. By making the taper angle 109 of the end portion of the electrode layer 103 larger than the taper angle 111 of the end portion of the heat accumulation layer 102 (and smaller than 90 degrees) in this manner, it was possible to further reduce changes in the bend angle of the heat generating resistive layer 104 in the bent portion 112 in the boundary 110 and concave bottom of the two tapered portions from the end portion 103*a* of the electrode layer 103 to the end portion of the heat accumulation layer 102 and the film quality of the heat generating resistive layer 104 could be improved.

Incidentally, in a case where the taper angle 109 of the electrode layer 103 does not differ from the taper angle 111 of its base (the heat accumulation layer 102) even when etching is performed under specific etching conditions, the two taper angles may be caused to differ from each other by adopting different etching conditions for the electrode layer 103 and the heat accumulation layer 104, which is the base of the electrode layer 103.

Also, during the etching of the electrode layer 103 the etching conditions may be changed so that the taper angle 109 of the end portion of the electrode layer 103 is changed as to be reduced by stages.

Next, after the step of FIG. 6B, in the same manner as in the case of FIGS. 5E, 5F and 5G, a TaN film having a film thickness of 0.04 μm as a heat generating resistive layer 104 and an SiN film having a film thickness of 0.3 μm as an upper insulative protective film 105 were formed on the electrode layer 103, and a Ta film having a film thickness of 0.2 μm as a metal protective film 106 was further formed on the upper insulative protective film 105, whereby a substrate for an ink jet recording head having a heat generating resistive body of the structure shown in FIG. 3 was formed.

Figure 6C:
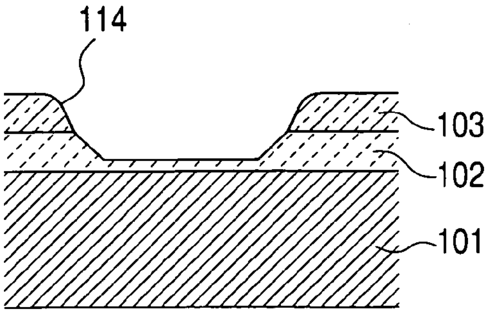
Figure 6D:
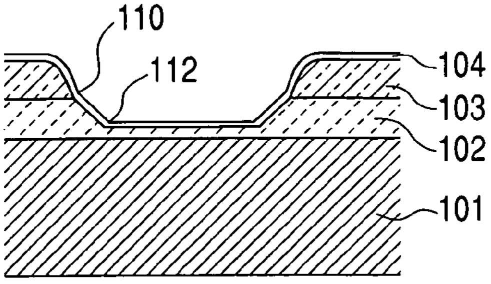
Figure 6E:
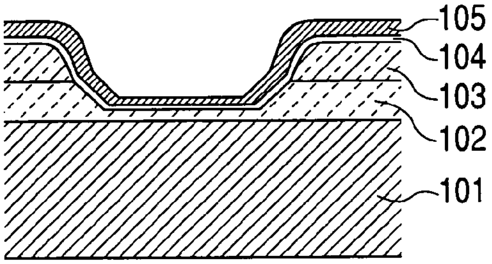
Figure 6F:
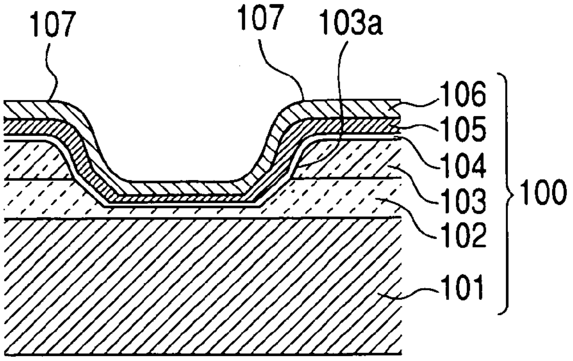

As shown in FIG. 6C, when the electrode layer 103 side of a substrate 100 was sputter etched for 20 seconds by applying high frequency waves of 100 W to the substrate 100 in Ar gas before the formation of the heat generating resistive layer 104, owing to sputtering characteristics, that is, because protrusions are etched early, a corner portion 114 of the top of the stepped part of the Al electrode layer of the electrode layer 103 was etched earlier than other portions and the corner portion 114 became rounded. That is, in the obtained structure, the corner portion 114 formed by the inclined surface of the end portion of the electrode layer 103 and the top surface of the electrode layer had a larger inclination than the end portion of the electrode layer 103. A great cost rise can be prevented by performing the step of forming a rounded curved surface on this corner portion 114 and the later film forming step of the heat generating resistive layer 104 on the electrode layer 103 by use of the same sputtering device.

In this way, after the step of FIG. 6C, in the same manner as in the case of FIGS. 5E, 5F and 5G, a TaN film having a film thickness of 0.04 μm as a heat generating resistive layer 104 (FIG. 6D) and an SiN film having a film thickness of 0.3 μm as an upper insulative protective film 105 (FIG. 6E) were formed on the electrode layer 103, and a Ta film having a film thickness of 0.2 μm as a metal protective film 106 (FIG. 6F) was further formed on the upper insulative protective film 105, whereby a substrate for an ink jet recording head having a heat generating resistive body of the structure shown in FIG. 4 was formed.

By rounding the corner portion 114 of the top of the stepped portion of the electrode layer in this manner, the coverage by the upper protective layer 105 and the metal protective layer 106 is improved. This is because abnormal growth of each of the protective layers in the corner portion 114 of the top of the stepped portion of the electrode layer does not occur, with the result that portions which might show film defects due to abnormal growth do not occur and each of the protective layers is relatively uniformly formed in the stepped part of the electrode layer. For this reason, it is possible to prevent the occurrence of broken wires due to ink infiltration into the electrode layers 103 under each of the protective layers and hence it is possible to form each of the protective films 105, 106 relatively thin.

Incidentally, it is good if the corner portion of the electrode layer has no area having an acute angle. When the corner portion of the electrode layer has roundness even if only slightly, it is possible to obtain an effect according to the degree of the roundness.

Figure 7:
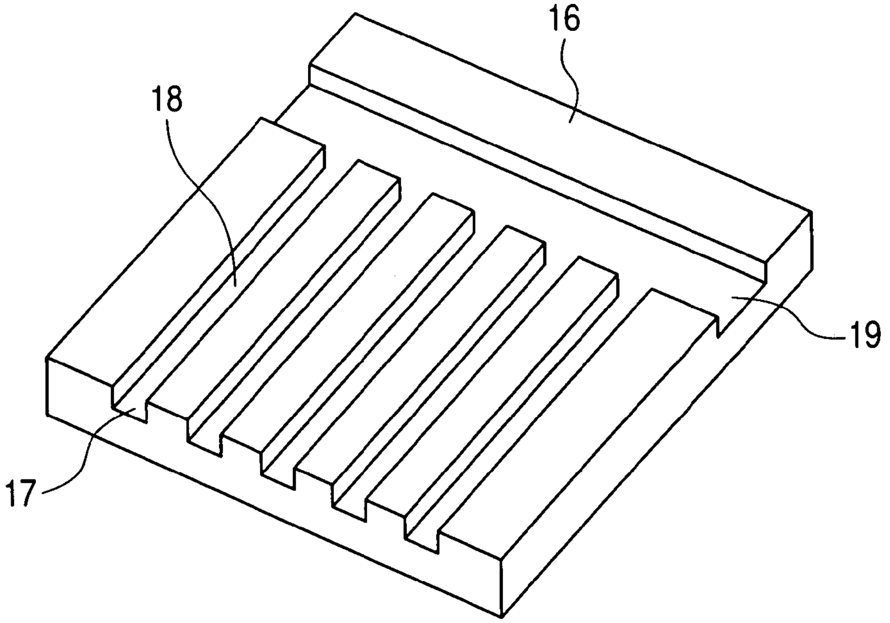
FIG. 7 is a schematic perspective view of a top board having liquid channels and grooves for the formation of a liquid chamber, which is used in an example of an ink jet recording head manufactured by using a substrate for a head manufactured by a manufacturing method of the present invention.
Figure 8:
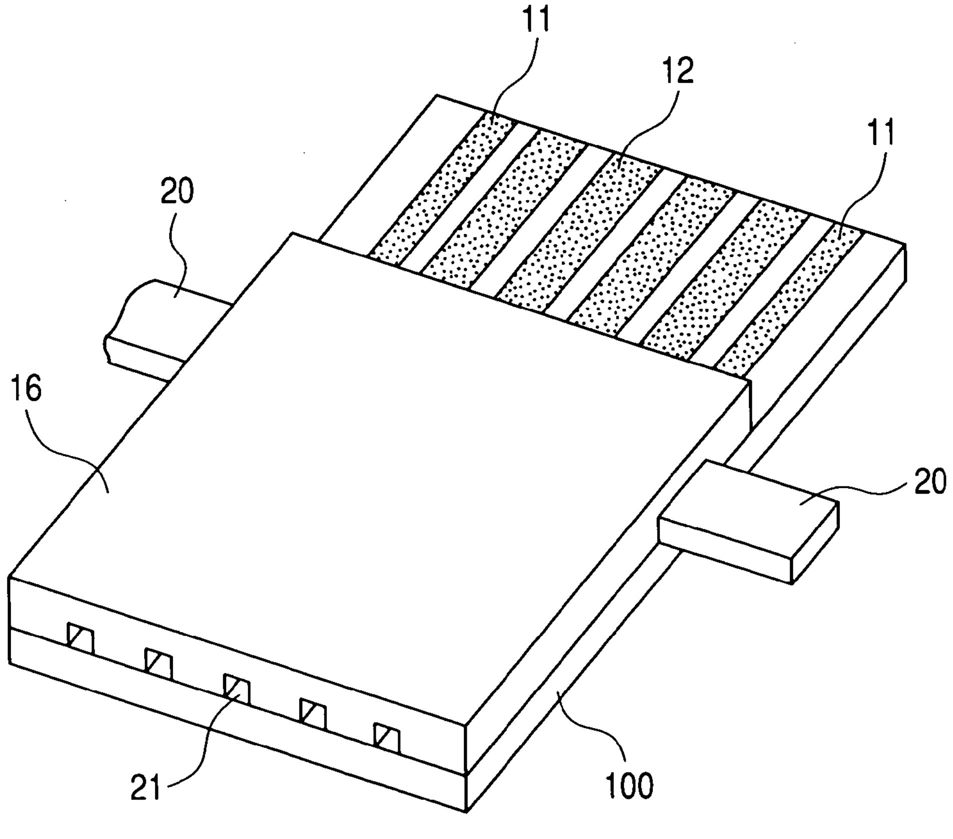
FIG. 8 is a schematic perspective view of an example of an ink jet recording head, which is obtained by using a substrate for a head manufactured by a manufacturing method of the present invention.
Figure 9:
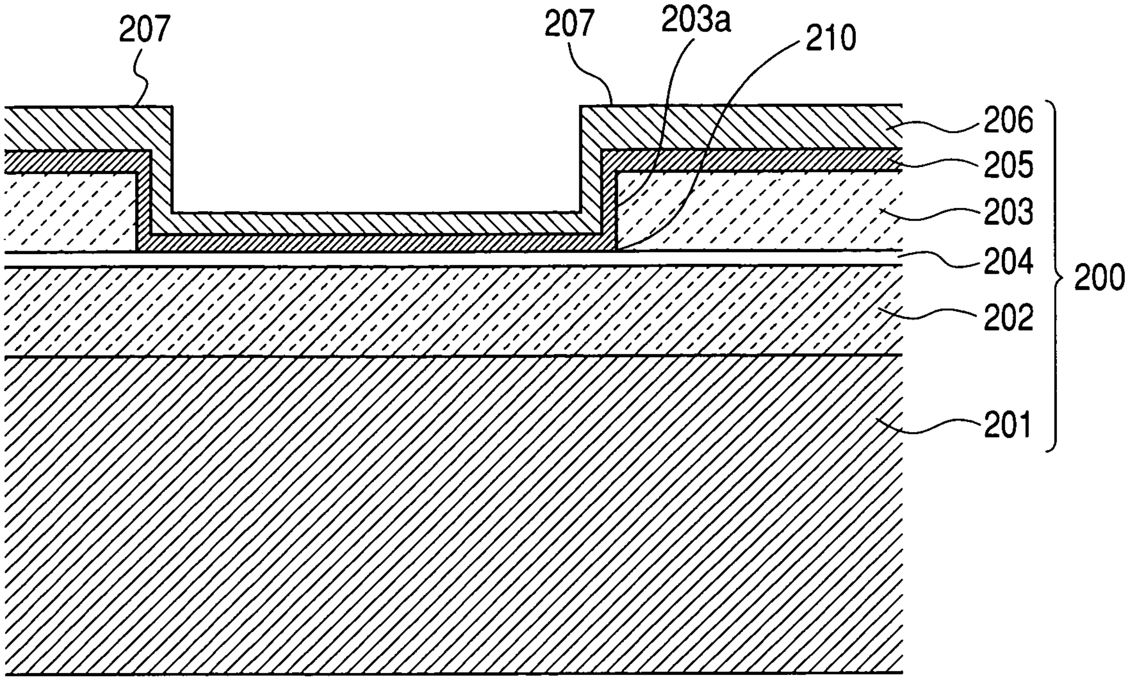
FIG. 9 is a schematic sectional view of an example of a conventional substrate for an ink jet recording head.

FIG. 7 is a schematic perspective view of a top board having liquid channels and grooves for the formation of a liquid chamber, which constitutes an ink jet recording head manufactured obtained by using a substrate for a head manufactured by the above-described manufacturing method, and FIG. 8 is a schematic perspective view of an ink jet recording head, which is assembled by using a substrate for a head manufactured by the above-described manufacturing method and the top board of FIG. 7.

After the formation of a substrate 100 having thermal energy generating means (a heat acting portion 107) provided with protective layers 105, 106 as described above on a board 101, the ink jet recording head shown in FIG. 8 is obtained by joining to this substrate 100 a top board 16 (FIG. 7) having liquid channels 17 corresponding to each of the thermal energy generating means and grooves 18 formed to provide liquid discharge ports 21 in communication with the liquid channels. Incidentally, a liquid supply tube 20 is connected to a common liquid chamber 19 as required, and a liquid such as ink is introduced into the head through the liquid supply tube 20. Electrodes 11, 12 supply the energy power for ink discharge to the heat acting portion (heat generating portion) 107 by conducting with each of the above-described pair of electrode layers.

Incidentally, in the formation of the liquid discharge ports 21, the liquid channels 17, etc., the use of the top board 16 is not always necessary and these components may be formed by the patterning of a photosensitive resin and the like. The present invention is not limited only to a multiarray type ink jet recording head having multiple liquid discharge outlets as described above, and of course it can be applied also to a single-array type ink jet recording head having one liquid discharge outlet.

Figure 10:
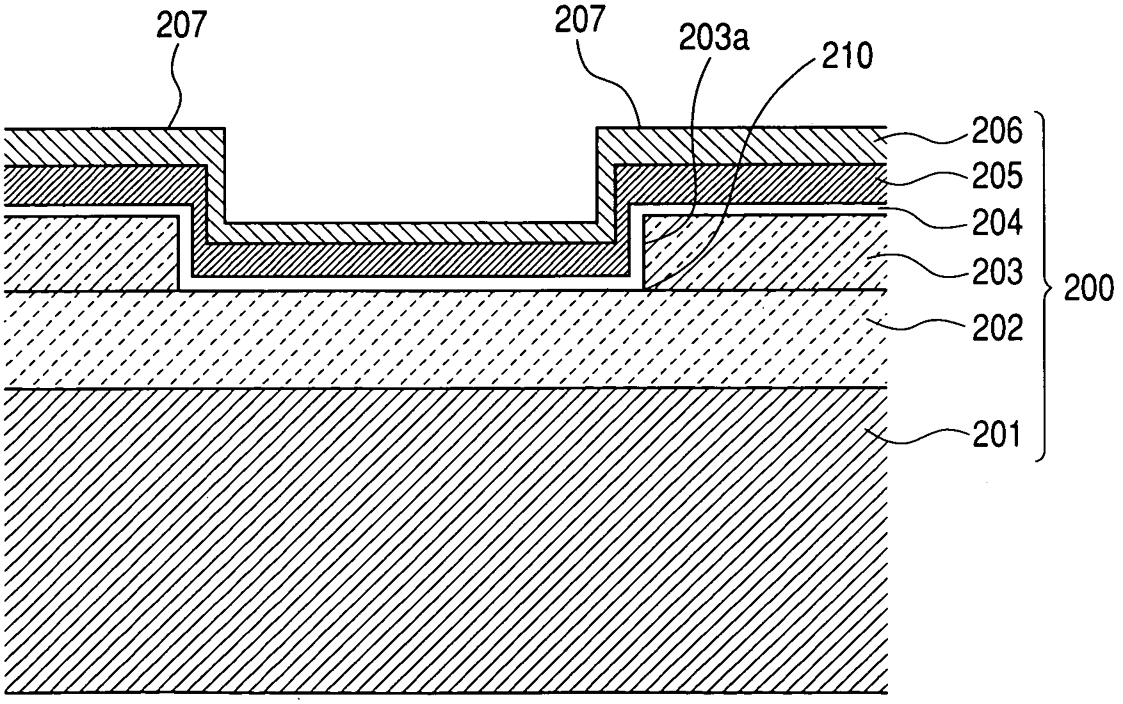
FIG. 10 is a schematic sectional view of another example of a conventional substrate for an ink jet recording head.

A discharge endurance test of ink was conducted by using this head. The heat generating resistive layer 104 showed no broken wire even after the input of discharge signals of not less than $1\times10^9$ pulses although the film thickness of the upper insulative protective layer 105 was ½ of the film thickness of the electrode layer 103, and the pulse endurance life was longer than that of a head of the conventional structure shown in FIG. 10.

This is because in the structure of this embodiment, the portion of the heat generating resistive layer 104 to which thermal stresses by the current concentration are applied most strongly (i.e., the portion of the heat generating resistive layer 104 which covers a boundary (a stepped portion of the electrode layer) 110 between an end portion of the electrode layer 103 and the heat accumulation layer 102) is away from a bent portion 112 where the film quality of the heat generating resistive layer 104 is relatively poor, and because by ensuring that the angle 109 of the tapered shape (the taper angle of the electrode layer) in the end portion of the pair of electrode layers is larger than the taper angle 111 (the taper angle of the base) in the tapered portion of the support (heat accumulation layer 102), which is a support of the base of the electrode layer, the heat generating resistive layer 104 covering the boundary 110 between the end portion of the electrode layer 103 and the tapered portion of the heat accumulation layer 102, the film quality of the surface portion of the heat generating resistive layer 104 can be improved. As a result of this, the occurrence of broken wires in the surface portion due to thermal stresses could be further suppressed and the discharge endurance performance could be improved.

Furthermore, in the structure of this embodiment, the shape of the bent portion 113 of the protective layers 105, 106 becomes gentler. Besides the step coverage of the protective layers 105, 106 is improved by rounding the corner portion 114 of the electrode layer 103 and the heat generated in the heat acting portion 107 is efficiently transmitted to a liquid such as ink by further reducing the film thickness of the upper insulative protective layer 105. Therefore, the liquid can be discharged by causing bubbling with less power.

This application claims priority from Japanese Patent Application Nos. 2004-137510 filed May 6, 2004 and 2005-106287 filed Apr. 1, 2005, which are hereby incorporated by reference herein.

What is claimed is:

1. A method of manufacturing a substrate for an ink jet recording head having an insulative layer, a pair of electrodes provided on the insulative layer and having a gap therebetween, and a heat generating resistive layer for covering the electrodes and the gap, said method comprising:

forming an electrode layer on the insulative layer;

removing a portion of the electrode layer in which the gap is formed by etching; and forming a recess in a surface portion of the insulative layer by etching the surface portion of the insulative layer corresponding to the gap.

2. The method of manufacturing a substrate for an ink jet recording head according to claim 1, wherein a tapered shape is formed in a portion of the recess of the insulative layer which is continuous from ends of the electrodes.

3. The method of manufacturing a substrate for an ink jet recording head according to claim 2, wherein a tapered shape is formed in end portions of the pair of electrodes which are opposed to each other.

4. The method of manufacturing a substrate for an ink jet recording head according to claim 3, wherein the tapered shape in the end portions of the electrodes is formed in such a manner as to have a larger angle than the tapered shape in the insulative layer.

5. The method of manufacturing a substrate for an ink jet recording head according to claim 4, wherein the etching is dry etching and an etching atmosphere during dry etching when the tapered shape is formed in the electrode layer has a higher degree of vacuum than an etching atmosphere during dry etching when the tapered shape is not formed in the electrode layer.

6. The method of manufacturing a substrate for an ink jet recording head according to claim 5, wherein in the etching atmosphere, an etching rate of the insulative layer is lower than an etching rate of the electrode layer.

7. The method of manufacturing a substrate for an ink jet recording head according to claim 1, further comprising a step of rounding corner portions of end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

8. The method of manufacturing a substrate for an ink jet recording head according to claim 4, further comprising a step of rounding corner portions of the end portions of the pair of electrodes which are opposed to each other by sputter etching, a step of forming the heat generating resistive layer on the pair of electrodes and on the gap between the pair of electrodes and a step of forming a protective film which covers the heat generating resistive layer.

9. The method of manufacturing a substrate for an ink jet recording head according to claim 6, further comprising a step of rounding corner portions of the end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

10. A method of manufacturing an ink jet recording head having a discharge port to discharge ink and thermal energy generating means which is provided to serve the discharge port and generates thermal energy used in discharging ink, the thermal energy generating means having a pair of electrodes disposed on a surface of an insulative layer and having a gap therebetween and a heat generating resistive layer for covering the pair of electrodes and the gap, said method comprising:

forming an electrode layer on the insulative layer;

removing a portion of the electrode layer in which the gap is formed by etching;

forming a recess in a surface portion of the insulative layer by etching the surface portion of the insulative layer corresponding to the gap; and forming a liquid path for discharging ink through the discharge port by thermal energy from the thermal energy generating means.

11. The method of manufacturing an ink jet recording head according to claim 10, wherein a tapered shape is formed in a portion of the recess of the insulative layer which is continuous from ends of the electrodes.

12. The method of manufacturing an ink jet recording head according to claim 11, wherein a tapered shape is formed at end portions of the pair of electrodes which are opposed to each other.

13. The method of manufacturing an ink jet recording head according to claim 12, wherein the tapered shape in the end portions of the electrodes is formed in such a manner as to have a larger angle than the tapered shape in the insulative layer.

14. The method of manufacturing an ink jet recording head according to claim 13, wherein the etching is dry etching and an etching atmosphere during dry etching when the tapered shape is formed in the electrode layer has a higher degree of vacuum than an etching atmosphere during dry etching when the tapered shape is not formed in the electrode layer.

15. The method of manufacturing an ink jet recording head according to claim 14, wherein in the etching atmosphere, an etching rate of the insulative layer is lower than an etching rate of the electrode layer.

16. The method of manufacturing an ink jet recording head according to claim 10, further comprising a step of rounding corner portions of end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

17. The method of manufacturing an ink jet recording head according to claim 13, further comprising a step of rounding corner portions of the end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

18. The method of manufacturing an ink jet recording head according to claim 15, further comprising a step of rounding corner portions of the end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

19. A method of manufacturing a substrate for an ink jet recording head having an insulative layer, a pair of electrodes provided on the insulative layer and having a gap therebetween, and a heat generating resistive layer for covering the electrodes and the gap, said method comprising:

forming an electrode layer on the insulative layer; and etching the electrode layer to form the gap and a surface portion of the insulative layer to form a recess corresponding to the gap.

20. The method of manufacturing a substrate for an ink jet recording head according to claim 19, wherein a tapered shape is formed in a portion of the recess of the insulative layer which is continuous from ends of the electrodes.

21. The method of manufacturing a substrate for an ink jet recording head according to claim 20, wherein a tapered shape is formed in end portions of the pair of electrodes which are opposed to each other.

22. The method of manufacturing a substrate for an ink jet recording head according to claim 21, wherein the tapered shape in the end portions of the electrodes is formed in such a manner as to have a larger angle than the tapered shape in the insulative layer.

23. The method of manufacturing a substrate for an ink jet recording head according to claim 22, wherein the etching is dry etching and an etching atmosphere during dry etching when the tapered shape is formed in the electrode layer has a higher degree of vacuum than an etching atmosphere during dry etching when the tapered shape is not formed in the electrode layer.

24. The method of manufacturing a substrate for an ink jet recording head according to claim 23, wherein in the etching atmosphere, an etching rate of the insulative layer is lower than an etching rate of the electrode layer.

25. The method of manufacturing a substrate for an ink jet recording head according to claim 19, further comprising a step of rounding corner portions of end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

26. The method of manufacturing a substrate for an ink jet recording head according to claim 22, further comprising a step of rounding corner portions of the end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

27. The method of manufacturing a substrate for an ink jet recording head according to claim 24, further comprising a step of rounding corner portions of the end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

28. A method of manufacturing an ink jet recording head having a discharge port to discharge ink and thermal energy generating means which is provided to serve the discharge port and generates thermal energy used for discharging ink, the thermal energy generating means having a pair of electrodes disposed on a surface of an insulative layer having a gap therebetween and a heat generating resistive layer for covering the electrodes and the gap, said method comprising:

- forming an electrode layer on the insulative layer;
- etching the electrode layer to form the gap and a surface portion of the insulative layer to form a recess corresponding to the gap; and
- forming a liquid path for discharging ink through the discharge port by thermal energy from the thermal energy generating means.

29. The method of manufacturing an ink jet recording head according to claim 28, wherein a tapered shape is formed in a portion of the recess of the insulative layer which is continuous from ends of the electrodes.

30. The method of manufacturing an ink jet recording head according to claim 29, wherein a tapered shape is formed at end portions of the pair of electrodes which are opposed to each other.

31. The method of manufacturing an ink jet recording head according to claim 30, wherein the tapered shape in the end portions of the electrodes is formed in such a manner as to have a larger angle than the tapered shape in the insulative layer.

32. The method of manufacturing an ink jet recording head according to claim 31, wherein the etching is dry etching and an etching atmosphere during dry etching when the tapered shape is formed in the electrode layer has a higher degree of vacuum than an etching atmosphere during dry etching when the tapered shape is not formed in the electrode layer.

33. The method of manufacturing an ink jet recording head according to claim 32, wherein in the etching atmosphere, an etching rate of the insulative layer is lower than an etching rate of the electrode layer.

34. The method of manufacturing an ink jet recording head according to claim 28, further comprising a step of rounding corner portions of end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

35. The method of manufacturing an ink jet recording head according to claim 31, further comprising a step of rounding corner portions of the end portions of the pair of electrodes which are opposed to each other by sputter etching, a step of forming the heat generating resistive layer on the pair of electrodes and on the gap between the pair of electrodes and a step of forming a protective film which covers the heat generating resistive layer.

36. The method of manufacturing an ink jet recording head according to claim 33, further comprising a step of rounding corner portions of the end portions of the pair of electrodes which are opposed to each other by sputter etching, a step of forming the heat generating resistive layer on the pair of electrodes and on the gap between the pair of electrodes and a step of forming a protective film which covers the heat generating resistive layer.

37. A method of manufacturing a substrate for an ink jet recording head, comprising:

- providing a substrate having an insulative layer formed thereon;
- forming an electrode layer on the insulative layer; and
- etching the electrode layer to form a gap corresponding to a thermal energy generating portion for generating thermal energy used for discharging ink and a surface portion of the insulative layer to form a recess corresponding to the gap.

38. The method of manufacturing a substrate for an ink jet recording head according to claim 37, wherein a tapered shape is formed in a portion of the recess of the insulative layer which is continuous from ends of the electrode layer.

39. The method of manufacturing a substrate for an ink jet recording head according to claim 38, wherein a tapered shape is formed in end portions of the electrode layer which are opposed to each other.

40. The method of manufacturing a substrate for an ink jet recording head according to claim 39, wherein the tapered shape in the end portions of the electrode layer is formed in such a manner as to have a larger angle than the tapered shape in the insulative layer.

41. The method of manufacturing a substrate for an ink jet recording head according to claim 40, wherein the etching is dry etching and an etching atmosphere during dry etching when the tapered shape is formed in the electrode layer has a higher degree of vacuum than an etching atmosphere during dry etching when the tapered shape is not formed in the electrode layer.

42. The method of manufacturing a substrate for an ink jet recording head according to claim 41, wherein in the etching atmosphere, an etching rate of the insulative layer is lower than an etching rate of the electrode layer.

43. The method of manufacturing a substrate for an ink jet recording head according to claim 37, further comprising a step of rounding corner portions of end portions of the electrode which are opposed to each other by sputter etching, a step of forming a heat generating resistive layer on the electrode and on the gap, and a step of forming a protective film which covers the heat generating resistive layer.

44. The method of manufacturing a substrate for an ink jet recording head according to claim 40, further comprising a step of rounding corner portions of the end portions of the electrode layer which are opposed to each other by sputter etching, a step of forming a heat generating resistive layer on the electrode layer and on the gap, and a step of forming a protective film which covers the heat generating resistive layer.

45. The method of manufacturing a substrate for an ink jet recording head according to claim 42, further comprising a step of rounding corner portions of the end portions of the electrode layer which are opposed to each other by sputter etching, a step of forming a heat generating resistive layer on the electrode layer and on the gap, and a step of forming a protective film which covers the heat generating resistive layer.

46. A method of manufacturing an ink jet recording head having a discharge port to discharge ink and thermal energy generating means which is provided to serve the discharge port and generates thermal energy used for discharging ink, the thermal energy generating means having a pair of electrodes disposed on a surface of an insulative layer and having a gap therebetween and a heat generating resistive layer for covering the electrodes and the gap, said method comprising:

providing a substrate having the insulative layer formed thereon;

forming an electrode layer on the insulative layer;

etching the electrode layer to form the gap corresponding to the thermal energy generating means for generating the thermal energy used for discharging the ink and a surface portion of the insulative layer to form a recess corresponding to the gap;

forming the heat generating resistive layer for covering the electrode layer and the gap; and forming a liquid path for discharging the ink through the discharge port by the thermal energy from the thermal energy generating means.

47. The method of manufacturing an ink jet recording head according to claim 46, wherein a tapered shape is formed in a portion of the recess of the insulative layer which is continuous from ends of the electrodes.

48. The method of manufacturing an ink jet recording head according to claim 47, wherein a tapered shape is formed at end portions of the pair of electrodes which are opposed to each other.

49. The method of manufacturing an ink jet recording head according to claim 48, wherein the tapered shape in the end portions of the electrodes is formed in such a manner as to have a larger angle than the tapered shape in the insulative layer.

50. The method of manufacturing an ink jet recording head according to claim 49, wherein the etching is dry etching and an etching atmosphere during dry etching when the tapered shape is formed in the electrode layer has a higher degree of vacuum than an etching atmosphere during dry etching when the tapered shape is not formed in the electrode layer.

51. The method of manufacturing an ink jet recording head according to claim 50, wherein in the etching atmosphere, an etching rate of the insulative layer is lower than an etching rate of the electrode layer.

52. The method of manufacturing an ink jet recording head according to claim 46, further comprising a step of rounding corner portions of end portions of the pair of electrodes which are opposed to each other by sputter etching, a step of forming the heat generating resistive layer on the pair of electrodes and on the gap between the pair of electrodes, and a step of forming a protective film which covers the heat generating resistive layer.

53. The method of manufacturing an ink jet recording head according to claim 49, further comprising a step of rounding corner portions of the end portions of the pair of electrodes which are opposed to each other by sputter etching, a step of forming the heat generating resistive layer on the pair of electrodes and on the gap between the pair of electrodes and a step of forming a protective film which covers the heat generating resistive layer.

54. The method of manufacturing an ink jet recording head according to claim 51, further comprising a step of rounding corner portions of the end portions of the pair of electrodes which are opposed to each other by sputter etching, a step of forming the heat generating resistive layer on the pair of electrodes and on the gap between the pair of electrodes and a step of forming a protective film which covers the heat generating resistive layer.

* * * * *